3,357,796
RECOVERY OF CHLORINE FROM WASTE GASES

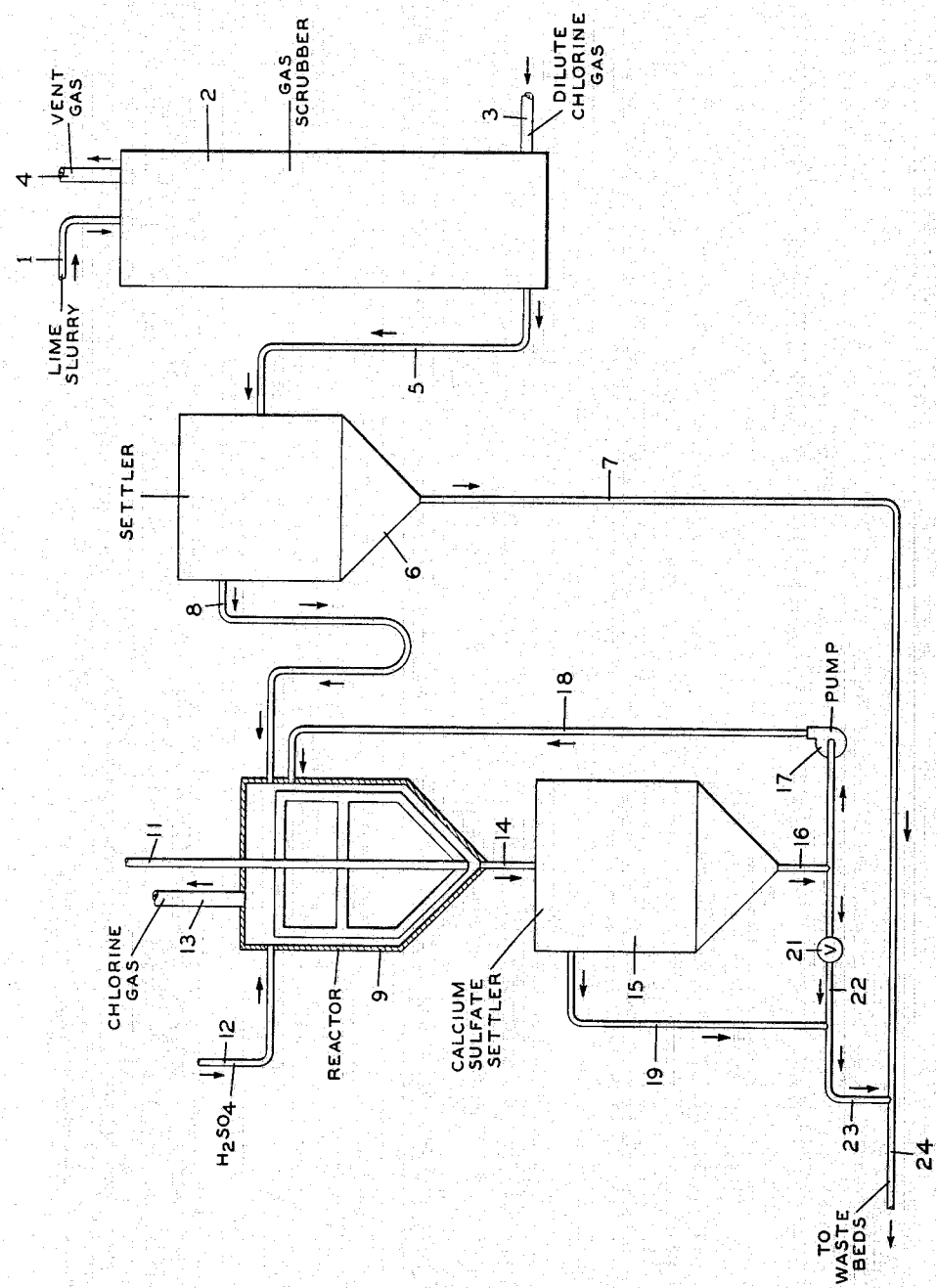

Carlton J. Howard, Salina, and Eugene B. Port, Solvay, N.Y., assignors to Allied Chemical Corporation, New York, N.Y., a corporation of New York
Filed Aug. 10, 1965, Ser. No. 478,560
5 Claims. (Cl. 23—219)

This invention relates to recovery of chlorine from dilute chlorine gases and more particularly refers to a new and improved process for treatment of gases containing small amounts of chlorine to separate and recover therefrom chlorine gas in concentrated and purified form.

Commercially there is produced as a by-product from chlorine producing plants, dilute waste gases referred to in the industry as tail gas or "sniff" gas. Discharge of such dilute chlorine gases into the atmosphere would pollute the atmosphere and further would result in a loss of valuable chlorine. While it is possible and indeed often necessary due to governmental regulation to convert the chlorine in the dilute gases to another form e.g. sodium hypochlorite or calcium hypochlorite, such operations are generally not profitable because of the low concentration of the chlorine in the gases.

An object of the present invention is to provide an efficient method of recovering chlorine in concentrated and purified form from dilute waste gases. Other objects and advantages of the present invention will be apparent from the following description and accompanying drawing.

In accordance with the present invention chlorine in purified and concentrated form is recovered from dilute chlorine gas by a process of passing the dilute chlorine gas in contact with a calcium hydroxide slurry to effect reaction of the chlorine and calcium hydroxide to produce an aqueous solution of calcium hypochlorite and calcium chloride, regulating the relative proportions of calcium hydroxide and chlorine to provide an excess of not more than 20% calcium hydroxide preferably 1–6% excess calcium hydroxide in the reaction mixture, separating the clear liquor containing dissolved calcium hypochlorite and calcium chloride from insoluble solids contained in the reaction mixture, introducing the clear liquor into a reaction zone wherein the clear liquor is admixed and reacted with sulfuric acid to produce chlorine and calcium sulfate dihydrate, discharging chlorine from the reaction zone, maintaining the concentration of calcium sulfate dihydrate solids in the reaction zone in an amount at least 20%, preferably 20–40% solids suspended in any part of the liquid in the reaction zone, adding sufficient acid to the reaction mixture in the reaction zone to reduce the pH of the clear liquor to a pH below 2 preferably about 1.2 to 1.7, maintaining the temperature of the reaction mixture below 90° C. preferably within the range of about 30–60° C., discharging the slurry of calcium sulfate dihydrate from the reaction zone, separating the calcium sulfate dihydrate slurry into a more dilute slurry and a more concentrated slurry of calcium sulfate dihydrate, and returning the more concentrated slurry of calcium sulfate dihydrate to the reaction zone in an amount sufficient to maintain at least 20% concentration of solids in the slurry in the reaction zone.

The accompanying drawing diagrammatically illustrates one method of carrying out the present invention.

The first step of the operation involves the absorption of chlorine from tail and "sniff" gases from a chlorine plant by passing the gas counter-current to a falling stream of calcium hydroxide slurry. The lime slurry is chlorinated until its chlorine absorption capacity is nearly exhausted at which point it can be referred to as "spent lime slurry." Referring to the drawing the lime slurry in which the amount of calcium hydroxide may vary from about 2% to in excess of about 10% by weight of the slurry is passed through line 1 into gas scrubber 2 which may be any suitable vessel equipped with baffles or plates or filled with packing to effect intimate contact between the gas and lime slurry. Dilute chlorine gas containing minor amounts of chlorine of the order of a few percent down to as low as a fraction of a percent chlorine is passed through line 3 into the bottom of gas scrubber 2, thence upwardly through the gas scrubber counter-current to the down flowing lime slurry and the scrubbed gas exits into the atmosphere via vent 4. The amount of lime slurry fed to the gas scrubber is controlled so that only a small excess of lime remains in the slurry leaving the gas scrubber via line 5 to settler 6. The absorption of chlorine from dilute chlorine gases by passing the gases in contact with calcium hydroxide slurry in gas scrubber 2 may be illustrated by the following equation

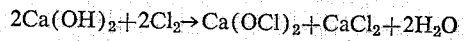

$$2Ca(OH)_2 + 2Cl_2 \rightarrow Ca(OCl)_2 + CaCl_2 + 2H_2O$$

Insoluble matter settles to the bottom of settler 6 and is withdrawn via line 7. Relatively clear liquor containing calcium hypochlorite, calcium chloride and a minor amount of calcium hydroxide overflows from settler 6 through line 8 to reactor 9. The overflow through line 8 constitutes generally well over 90% of the liquor with the remaining few percent being discharged through line 7.

Reactor 9 is agitated preferably with a paddle type agitator 11, so that a fairly uniform suspension of calcium sulfate dihydrate is maintained therein. Sulfuric acid aqueous solution is fed to reactor 9 through line 12. Desirably the entry of line 12 is placed so that it is well removed from the entry point of line 8 to avoid precipitation of poorly settling $CaSO_4 \cdot 2H_2O$ which often results when these two streams are introduced at the same point in the reactor. The concentration of solids in the slurry is kept at a level such that at least 20% solids are present in any given part of the slurry volume, with overall solids in suspension kept in the range of 20 to 40%. Substantially lower concentrations give rise to poorer crystals and a slurry difficult to settle, while substantially higher concentrations produce slurries that are difficult to pump and agitate. The acid addition is controlled so that free chlorine is liberated from the solution which is maintained at a pH below 2, preferably about 1.5 (measured in liquor cooled to room temperature). Chlorine leaves the reactor via line 13 which chlorine is of a sufficient purity and concentration that it generally can be combined directly with the chlorine stream produced in the plant e.g. line 13 can be connected directly to the header drawing off chlorine from the electrolysis cells. The temperature of the reactor is kept below 90° C. and may be operated as low as about 10° C. but is preferably operated within the range of 30–60° C.

The slurry from reactor 9 passes through line 14 to calcium sulfate settler 15. Here the slurry is thickened so that a slurry containing about 30 to 50% suspended solid CaSO$_4$·2H$_2$O is collected at the bottom of the tank. This is withdrawn through line 16 to pump 17 and returned through line 18 to reactor 9. The thin slurry from settler 15 overflows through lines 19, 23 and 24 to waste beds. This slurry may be combined with the settled solids from calcium hypochlorite settler 6 which has sufficient alkali to raise the pH of the combined streams to above 7. Excess thickened slurry from settler 15 can be drawn through valve 21 and line 22 and sent to waste beds via lines 23 and 24.

The reaction in reactor 9 between the clear liquor containing calcium hypochlorite and calcium chloride to produce chlorine gas which is recovered and calcium sulfate precipitate may be illustrated by the following equation:

$$Ca(OCl)_2 + CaCl_2 + 2H_2SO_4 \rightarrow 2Cl_2 + 2CaSO_4 + 2H_2O$$

In some plants there is available waste lime and waste sulfuric acid which products often present a disposal problem. The process of the present invention permits the use of waste lime and waste sulfuric acid to recover a valuable product present in dilute form in a waste gas and converts sulfuric acid and waste lime into water and an insoluble solid composed primarily of calcium sulfate dihydrate. Such a procedure reduces pollution of the air and water table in the area surrounding the plant.

The conditions within the reactor are important to achieve a large grained precipitate which will give a non-scaling slurry which will have good settling characteristics. The CaSO$_4$.2H$_2$O tends to come out as growth on existing crystals resulting in a slurry with little tendency to deposit on the equipment. It is desirable to have a high solids concentration in the reaction vessel (1) to minimize scaling tendencies (2) because the resulting slurry has better handling characteristics and (3) because the chlorine recovery is better than from dilute slurries. The most desirable solids concentration range in the reaction slurry is 20–40% by weight. The rate of chlorine produced in the reactor is quite high and the reactants can be fed in at a feed rate which is equivalent to 8–10 lbs. of CaSO$_4$.2H$_2$O formed per gallon of reactor slurry per hour. Removal of chlorine generated in the reactor is simply achieved by the application of mild suction, two inches of water is generally sufficient to recover over 90% of the available chlorine in the Ca(OCl)$_2$ solution.

The solids content of the slurries was determined by weighing a batch of slurry, filtering on a sintered glass funnel with suction, washing the solids with water then acetone, drying the solids on paper at room temperature and finally weighing the dry solids. Dry solids were examined under the microscope.

The following example illustrates the present invention.

In an operation as diagrammatically illustrated lime is passed downwardly counter-current to dilute chlorine gas, and "spent lime" slurry is withdrawn from the gas scrubber and sent to the settler. The clear liquor leaving the settler after about 4 hours of hold-up time contains 50 g.p.l. Ca(OCl)$_2$, 49 g.p.l. CaCl$_2$ and 0.1 g.p.l. Ca(ClO$_3$)$_2$ and has a specific gravity of 1.08. The slurry leaving the bottom of the settler contains 11 parts of solution per 4 parts of insoluble muds. The ratio of overflow to underflow is about 97:15 in parts by weight.

The overflow from the calcium hypochlorite settler is sent to the reactor where 97 parts are reacted with 7.7 parts of 82% waste H$_2$SO$_4$. The rate of addition of these two streams is such that 8 to 10 lbs. of CaSO$_4$.2H$_2$O are are formed per gallon of reactor slurry per hour with 20% suspended CaSO$_4$.2H$_2$O solids in said slurry. 4.1 parts of chlorine are evolved from the reactor and collected by applying a slight suction to the gas vent of the reactor. This represents a 90% recovery of the available chlorine going to the reactor or 81% recovery of the available chlorine going to the calcium hypochlorite settler.

The slurry from the reactor is sent to the calcium sulfate settler and thickened slurry is returned to the reactor until the CaSO$_4$.2H$_2$O in suspension in the reactor reaches at least 20% by weight. This is easily measured by weighing 100 ml. of the slurry which must be at least 113 gm.

After operating with 20% CaSO$_4$.2H$_2$O solids in suspension in the reactor for an hour, the settling time of the solids suspended in the slurry drawn from the reactor is 1.5 minutes. When starting this reactor or when the feed streams of H$_2$SO$_4$ and Ca(OCl)$_2$ solution are close together, these settling times can be 20 minutes or longer. The faster settling slurries have good flow and pumping characteristics. Those with long settling times are almost gel-like in consistency and have poor flow and pumping characteristics. Another important advantage of the faster settling slurries is that the conditions under which they are formed tend to produce much less scaling of equipment. A still further advantage of the faster settling slurries is that the particles are larger and will have less tendency to "blow" when dry on a waste bed.

Although certain preferred embodiments of the invention have been disclosed for purpose of illustration, it will be evident that various changes and modifications may be made therein without departing from the scope and spirit of the invention.

We claim:

1. A process for the recovery of chlorine in purified and concentrated form from dilute chlorine gas by passing the dilute chlorine gas in contact with a calcium hydroxide slurry to effect reaction of the chlorine and calcium hydroxide to produce an aqueous solution of calcium hypochlorite and calcium chloride, admixing sulfuric acid with the aqueous solution of calcium hypochlorite and calcium chloride to effect reaction to produce chlorine and calcium sulfate dihydrate, discharging chlorine from the reaction mixture, and maintaining a concentration of calcium sulfate dihydrate solids in the reaction mixture in an amount of at least 20% solids suspended in any part of the liquid in the reaction mixture.

2. A process as claimed in claim 1 wherein an excess of calcium hydroxide is reacted with the chlorine and wherein the concentration of calcium sulfate dihydrate solids suspended in any part of the liquid in the reaction mixture is within the range of about 20–40%.

3. A process as claimed in claim 1 wherein a slurry of calcium sulfate dihydrate is discharged from the reaction mixture, said slurry is separated into a more dilute slurry and a more concentrated slurry of calcium sulfate dihydrate, and the more concentrated calcium sulfate dihydrate slurry returned to the reaction mixture in an amount sufficient to maintain the amount of solids in the reaction mixture at least about 20%.

4. A process for the recovery of chlorine in purified and concentrated form from dilute chlorine gas by passing the dilute chlorine gas counter-current to and in intimate contact with a calcium hydroxide slurry to effect reaction of the chlorine and calcium hydroxide to produce an aqueous solution of calcium hypochlorite and calcium chloride, regulating the relative proportion of calcium hydroxide and chlorine to provide an excess of about 1 to 6% calcium hydroxide over the amount stoichiometrically required to react with the chlorine in the dilute chlorine gas, separating clear liquor containing dissolved calcium hypochlorite and calcium chloride from insoluble solids contained in the reaction mixture, introducing the clear liquor into a reaction zone wherein the clear liquor is admixed and reacted with sulfuric acid to produce chlorine and calcium sulfate dihydrate, discharging evolved chlorine from the reaction zone, maintaining the concentration of calcium sulfate dihydrate solids in the reaction zone in an amount of about 20–40% solids suspended in any part of the liquid in the reaction zone, adding sufficient acid to the reaction mixture in the reaction zone to reduce the pH of the clear liquor to a pH below 2, maintaining the temperature of the reaction mixture within the range of about 30–60° C., discharging the slurry of calcium sulfate dihydrate from the reaction zone, separating the calcium sulfate dihydrate slurry into a more dilute slurry and a more concentrated slurry of calcium sulfate dihydrate, and returning more concentrated calcium sulfate dihydrate slurry to the reaction zone in amount sufficient to maintain the concentration of solids in the slurry in the reaction zone within the range of about 20–40%.

5. A process as claimed in claim 4 wherein the slurry of insoluble solids containing calcium hydroxide separated from the clear liquor is co-mingled with the slurry of calcium sulfate dihydrate discharged from the system.

References Cited

UNITED STATES PATENTS

| 601,006 | 3/1889 | Sturcke | 23—122 |
| 2,587,845 | 3/1952 | Heller | 23—86 |
| 2,965,443 | 12/1950 | Osborne et al. | 23—86 |
| 3,251,647 | 5/1966 | Nicolaisen | 23—86 |

FOREIGN PATENTS

| 515,293 | 11/1939 | Great Britain. |
| 37–7202 | 5/1962 | Japan. |

OSCAR R. VERTIZ, *Primary Examiner.*

EDWARD STERN, *Examiner.*